US007881448B2

(12) United States Patent
Boss et al.

(10) Patent No.: US 7,881,448 B2
(45) Date of Patent: Feb. 1, 2011

(54) METHOD AND SYSTEM FOR NOTIFYING A TELEPHONE USER OF AN AUDIO PROBLEM

(75) Inventors: Gregory Jensen Boss, American Fork, UT (US); Peter George Finn, Brampton (CA); Rick Allen Hamilton, II, Charlottesville, VA (US); James Wesley Seaman, Falls Church, VA (US)

(73) Assignee: International Business Machines Corporation, Armonk, NY (US)

( * ) Notice: Subject to any disclaimer, the term of this patent is extended or adjusted under 35 U.S.C. 154(b) by 1129 days.

(21) Appl. No.: 11/554,257

(22) Filed: Oct. 30, 2006

(65) Prior Publication Data

US 2008/0101557 A1 May 1, 2008

(51) Int. Cl.
*H04M 3/42* (2006.01)
(52) U.S. Cl. ............... 379/202.01; 379/158; 379/93.21; 379/88.08
(58) Field of Classification Search ............ 379/202.01, 379/204.01, 158, 93.21, 388.02, 388.01, 379/396, 88.08; 348/14.08, 14.09
See application file for complete search history.

(56) References Cited

U.S. PATENT DOCUMENTS

| | | | |
|---|---|---|---|
| 5,995,607 A | 11/1999 | Beyda et al. | |
| 6,516,024 B1 | 2/2003 | Dupuis et al. | |
| 6,677,821 B2 | 1/2004 | Kusunoki | |
| 6,795,544 B1 | 9/2004 | D'Arcy et al. | |
| 6,888,935 B1 * | 5/2005 | Day | 379/202.01 |
| 7,003,286 B2 | 2/2006 | Brown et al. | |
| 7,016,490 B2 | 3/2006 | Beutler et al. | |
| 2004/0203677 A1 | 10/2004 | Brown et al. | |
| 2004/0213402 A1 * | 10/2004 | Ruetschi | 379/388.06 |
| 2005/0094792 A1 * | 5/2005 | Berthoud et al. | 379/202.01 |
| 2006/0023061 A1 * | 2/2006 | Vaszary et al. | 348/14.08 |
| 2006/0126538 A1 * | 6/2006 | Krstulich | 370/260 |
| 2008/0037749 A1 * | 2/2008 | Metzger et al. | 379/202.01 |

FOREIGN PATENT DOCUMENTS

EP  1672898 A2  6/2006

* cited by examiner

*Primary Examiner*—Olisa Anwah
(74) *Attorney, Agent, or Firm*—Yee & Associates, P.C.; William H. Steinberg

(57) ABSTRACT

A method and apparatus is provided for notifying a telephone speaker engaged in a call or conference that the audio quality being received by one or more listeners is not acceptable. The notice is provided before the call or conference has ended, so that effective action can be taken to continue the conference. Embodiments of the invention can include both automatic and manual methods for informing a participant in a telephone call that audio distortion is occurring. An automated method uses audio sampling and comparative logic, while a manual method is accomplished using phone programming and a key entry sequence. A further embodiment provides means for any participant on a call to verify the audio quality of his or her own telephone.

9 Claims, 2 Drawing Sheets

METHOD AND SYSTEM FOR NOTIFYING A TELEPHONE USER OF AN AUDIO PROBLEM

BACKGROUND OF THE INVENTION

1. Field of the Invention

The invention disclosed and claimed herein generally pertains to a method and system for notifying a telephone user that the quality of his or her speech or other audio information, as received at another telephone, is not acceptable. More particularly, the invention pertains to a method of the above type wherein a telephone speaker is notified of his or her deficient audio quality, while a phone call or conference is still in progress.

2. Description of the Related Art

During a telephone call, and particularly during conference calls, the audio or line quality of a listening participant may not be acceptable, and may in fact be disruptive to the call. Moreover, if the party that is speaking is using a hands-free device such as a speaker phone, the audio input to that device will be muted, in order to avoid feedback. This will prevent other participants on the call from verbally informing the speaker that a problem exists with his or her audio quality. In this situation, the person speaking may continue for a long period of time without knowing that an audio problem exists, while the party or parties listening have no means of notifying the speaker of the problem.

At present, solutions to the above problem do not appear to be available. Some phones indicate signal quality by using graphic displays such as a series of "signal bars", where the bars depict signal strength between the phone and an associated active tower. However, the state of these signal bars frequently is not indicative of the actual audio quality. At present, the method used most commonly to correct audio degradation is simply for participants to wait until the speaker pauses long enough for another participant to verbally inform the speaker of the problem. Even this method may not succeed, if the person speaking is having inbound as well as outbound audio problems.

It is thus apparent that there is definite need for a mechanism to inform a speaking party on a telephone call that an audio problem exists, so that alternative communication and/or conferencing measures may be undertaken.

SUMMARY OF THE INVENTION

The invention generally provides a method and system or apparatus for notifying a telephone speaker engaged in a call or conference that the audio quality being received by one or more listeners is not acceptable. The notice is provided before the call or conference has ended, so that effective action can be taken to continue the conference. Embodiments of the invention can include both automatic and manual methods for informing a participant in a telephone call that audio distortion is occurring. An automated method uses audio sampling and comparative logic, while a manual method is accomplished using phone programming and a key entry sequence. A further embodiment provides means for any participant on a call to verify the audio quality of his or her own telephone. One embodiment of the invention, directed to a method used to send an audio message from a speaking party to at least one listening party, includes the step of transmitting the audio message from a first phone operated by the speaking party to a second phone operated by the listening party. The method further includes detecting a deficiency in the audio quality of a first portion of the audio message, and notifying the speaking party of the deficiency before the audio message has ended.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Modern telephones and telephonic devices (referred to herein as telephones or phones) are full duplex and can transmit and receive information simultaneously. Speaker phones, cell phones, VOIP-based phones and other high quality phones mask this capability by disabling the audio speaker on the active device while speech is in process, in order to remove possible feedback loops. Such loops are especially troublesome in conference call environments. Additionally, these phones have the capability of being programmed, and of taking automatic action when a programmed function is activated. One example of such behavior is the *69 (star-six-nine) feature of a phone, which when activated causes a telephone to dial the number of the last incoming call. These capabilities are used in embodiments of the invention, as described herein.

Figure 1A:
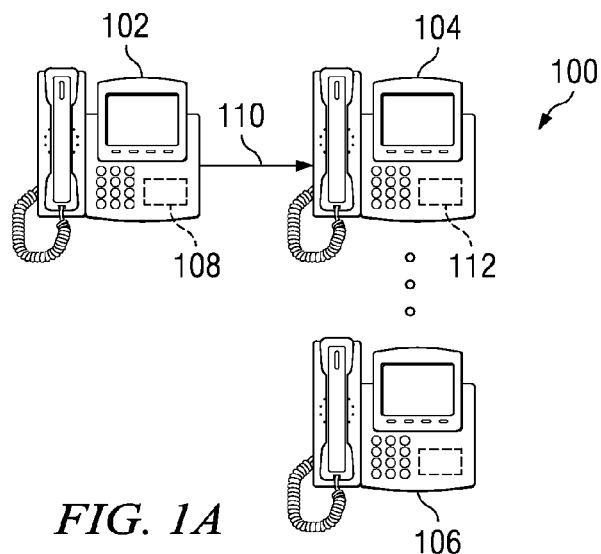
FIGS. 1A-1E are schematic diagrams respectively illustrating an embodiment of the invention.

Referring to FIG. 1A, there is shown a telephone system 100 that includes telephones 102 and 104, and possibly one or more additional phones 106. System 100 is used for a telephone conference wherein a user (not shown) of phone 102 is the speaking party, and users (not shown) of phones 104 and 106 are listening parties. Thus, phone 102 receives an audio message or information from its user, and transmits signals representing the audio message to phones 104 and 106. Phones 104 and 106 recover the audio message, and make it available to the respective users listening at these phones.

FIG. 1A further shows phone 102 provided with a data processing component 108. In an embodiment of the invention, processor component 108 is configured to automatically commence a procedure to detect distortion in the audio signals received at listener phones such as 104, and to alert the speaker at phone 102 of the distortion. More particularly, component 108 commences successive sampling intervals, whereby a sample of the audio message at speaker phone 102 is recorded during each interval. Moreover, processor component 108 causes a message 110 to be sent, instructing phone 104 to also record a sample of the audio message, as the message is received at phone 104, during one of the intervals. This activity is carried out by means of a data processor component 112 contained in phone 104.

Figure 1B:
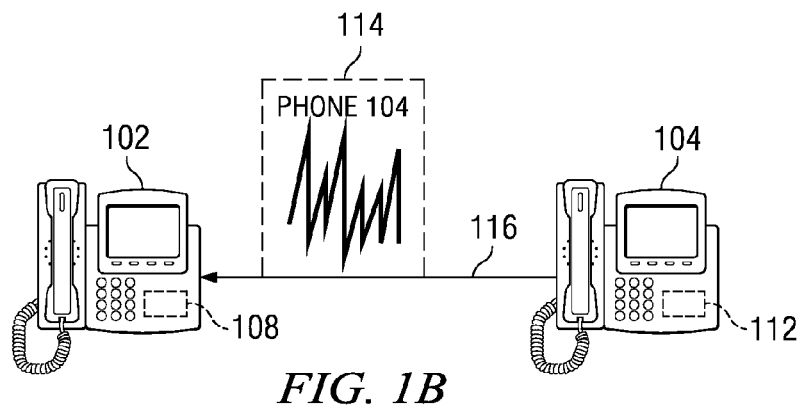

Referring to FIG. 1B, there is shown a sample 114 of the audio message, recorded at phone 104 during an interval, being sent to phone 102 by means of a link or transmission path 116. If the phone system is operating at a frequency of 900 GHz, there may be an available independent sideband signal, of 8 Khz for example, that could be used for both message 110 and transmission path 116.

Figure 1C:
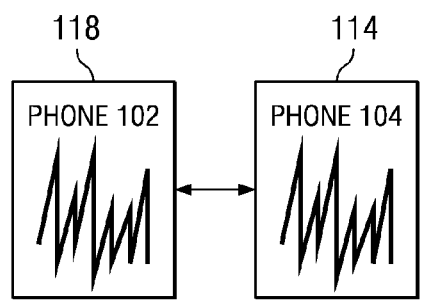

As illustrated by FIG. 1C, at phone 102 the audio sample 114 from phone 104 is compared with an audio sample 118, which is recorded at phone 102 during the same interval. If samples 114 and 118 are in analog form, the amplitudes of corresponding spectral components of the two samples could be compared, in order to determine whether amplitude variances between the samples are within a specified limit or tolerance. If samples 114 and 118 are in digital form, a bit counting technique could be used for the comparison. The principal issue is to determine the comparative signal strengths between the two samples.

Figure 1D:
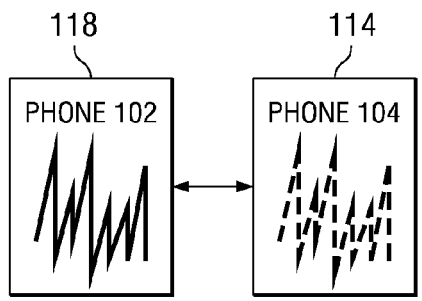
Figure 1E:
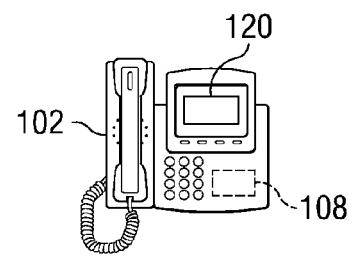

If variance between the two samples is found to be within the specified tolerance, as shown by FIG. 1C, further audio samples 114 and 118 are acquired and compared. However, if the variance or difference is outside of the tolerance, as shown by FIG. 1D, phone 102 is activated to notify the speaker of an audio problem. Speaker notification is depicted in FIG. 1E by changing the display window 120 of phone 102. Of course, any suitable notification method may be used, such as causing phone 102 to vibrate, or to flash a light source, display a text message, play a set audio message or pop up a message box. Additionally, the notification method can vary according to the type of device used for phone 102.

In a useful embodiment of the invention, samples of the audio message could be recorded during periods on the order of 5 to 30 seconds. In determining the sample duration and interval time between samples, it is important to recognize that a longer sample duration will create a larger sample size which takes more time to transmit and analyze. On the other hand, a sample duration that is too small may not capture intermittent errors. Also, sampling should take into account patterns of an average speaker. For example, if the speaker only pauses every 3 minutes, sending quality data every 10 seconds is not helpful. In view of these variables, a reasonable sample duration would be from 5 to 10 seconds, and a reasonable sample interval would be every 60 to 90 seconds. Sampling could also be auto-adjusted based on speaking patterns. Thus, during an interactive conversation, smaller and more frequent samples may be taken. During a conference call, where there is one predominant speaker, a larger and less frequent sample could be used.

The phones used in phone system 100 of FIG. 1A could, without limitation, include land-set, computer (VOIP) or cell-based types. Phones of all such types are currently available that include computer chips or small data processing components. It is anticipated that such chips or firmware therein could be readily modified or updated, in order to provide processor components that have the capabilities of components 108 and 112, as described above.

When an audio message is broadcast to multiple listening phones 104 and 106, embodiments of the invention can include the ability to compare audio quality at different phones. For example, processor component 108 can have additional logic that determines the only audio problem is with phone 104, when quality checks returned by other listening phones are found to be within tolerance. The user of phone 104 would then be notified of this situation.

The above embodiment also provides the means for an individual participant on a call to verify his or her own audio quality. To do this, a participant phone would record audio during the sample period, both when the user is a listener and a speaker. Then, at any point in time the user could input a programmed key sequence such as *77 (star-seven-seven) and have the audio from his or her last speaking session played back. As an example, during a lull in a conference call a user could press keys *77, and at a prompt press another key to select a duration of playback, such as key 5 in order to play back the last 5 seconds of the speaking time of that user. One of a number of well known logarithms could be used in order to select a sample of best, worst or medium quality. By means of this feature, the user would know what he or she sounds like at other phones.

A further embodiment of the invention provides a manual and participant-independent means for enabling a telephone listener to notify the speaker of an audio problem. In this case, the listener recognizes that the quality of a received audio message is not acceptable. To notify the speaker, the listener uses the keypad of his or her phone to enter a specific key sequence, which is then transferred to the speaker's phone.

Figure 2A:
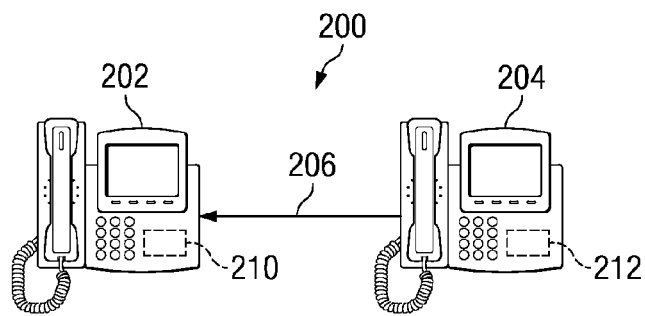
FIGS. 2A-2B are schematic diagrams respectively illustrating a second embodiment of the invention.

As an example, FIG. 2A shows a telephone system 200, wherein the user (not shown) of phone 202 is speaking, and the user (not shown) of phone 204 is listening. Upon realizing that audio quality is deficient, the following events occur:
(1) The listener enters a key sequence, such as *99 (star-nine-nine) into phone 204.
(2) The sequence causes an alert to be sent to phone 202, used by the active speaker, by means of a transmission path 206.
(3) The alert causes a notification action to occur at phone 202, as described above in connection with FIG. 1E.

Figure 2B:
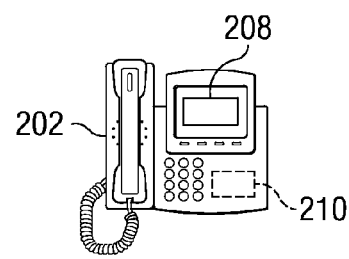

FIG. 2B depicts notification of phone 202 by changing the display 208 thereof. FIGS. 2A and 2B further depict phones 202 and 204 provided with data processing components 210 and 212, respectively, which have been configured to implement the events described above.

As an enhancement to the above embodiments, the user of phone 204 could additionally send a specific message to phone 202. As an example, upon entering the initial alert key sequence, the user of phone 204 could have the option of rating the audio quality received from phone 202 by depressing an additional key. This rating could take the form of a percentage, where depressing a number key would indicate a subjective percentage of quality (e.g., the 5 key would indicate 50% audio quality). Alternatively, depressing a number key could select a menu such as:
1. static or noise on the line
2. minor voice dropout
3. moderate voice dropout
4. severe voice dropout
5. complete audio loss Upon selection, the percentage for a specific message would be transmitted to phone 202, and could, for example, be played audibly or displayed as text to provide additional information to the user of phone 202. This embodiment may be readily used in connection with multi-participant calls and provides additional features in such environments. For example, if several listening participants activate the "rate by percentage" feature in a given period of time, logic in phone 202 could average the input and provide a single aggregate message to the user of phone 202. Alternatively, when menu-based messages are used, an aggregation of all inputs could produce a summary message such as "four participants have indicated static on the line and three participants have indicated minor voice dropout." Hybrid combinations of these and other methods likewise would be available for use and notification.

Embodiments of the invention, as described herein, may also be modified to permit a detected audio problem to be reported back to the carrier of the associated telephone system. For example, a phone user could press a key sequence, e.g., *611 (star-six-one-one), to send a recorded fragment of an audio message with a date/time stamp back to the carrier. Such qualitative documentation would permit faster diagnosis, particularly for intermittent quality issues. Without implementation of this feature, the caller would have to hang up, dial a carrier, wait to speak to a carrier representative, and describe the problem. It would then be necessary to wait for the arrival of a technician, at which time the audio problem may or may not be replicable. By providing the audio fragment with the date/time stamp, which would include an actual recording of the noise or other audio distortion, troubleshooting of the problem may be significantly expedited.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. In association with a telephone system used to send an audio message from a speaking party to at least one listening party, a method comprising the steps of:
    transmitting said audio message from a first phone operated by said speaking party to a second phone operated by said at least one listening party;
    detecting a deficiency in the audio quality of a first portion of said audio message, wherein detecting the deficiency comprises:
        sampling said first portion of said audio message during at least one sampling interval, at both said first and second phones, to provide first and second samples, respectively; and
        comparing said second sample with said first sample at said first phone, to determine the amount of any variance between said first and second samples; and
    notifying said speaking party of said deficiency, before said audio message has ended.

2. The method of claim 1, wherein:
    said speaking party is notified of a deficiency in the audio quality of said message, upon determining that the variance between said first and second samples exceeds a specified tolerance.

3. The method of claim 1, wherein:
    said audio message is broadcast to multiple listeners, and said detecting step determines that said audio quality of said message is deficient at the phone used by only one of said listeners.

4. The method of claim 1, wherein:
    following completion of said audio message, a sample of said audio message recorded at said second phone is sent to said first phone, in response to a key sequence entered into said first phone by said speaking party.

5. The method of claim 1, wherein:
    said at least one listening party, upon detecting a deficiency in the audio quality of said first portion, operates one or more pre-specified keys on said second phone to send a notification of said deficiency to said first phone.

6. The method of claim 5, wherein:
    said at least one listening party enters different key sequences on said second phone to send messages indicating different detected levels of quality of said audio message to said first phone.

7. The method of claim 1, wherein:
    a recorded sample of said deficient audio message, together with a corresponding date and time stamp, is delivered to a carrier associated with said telephone system.

8. In association with a telephone system used to send an audio message from a speaking party to at least one listening party, an apparatus comprising:
    means for transmitting said audio message from a first phone operated by said speaking party to a second phone operated by said at least one listening party;
    means for detecting a deficiency in the audio quality of a first portion of said audio message, wherein the means for detecting the deficiency comprises:
        a first processing component for sampling said first portion of said audio message during at least one sampling interval, at both said first and second phones, to provide first and second samples, respectively; and
        a second processing component comparing said second sample with said first sample at said first phone, to determine the amount of any variance between said first and second samples; and
    means for notifying said speaking party of said deficiency, before said audio message has ended.

9. In association with a telephone system used to send an audio message from a speaking party to at least one listening party, a method comprising the steps of:
    transmitting said audio message from a first phone operated by said speaking party to a second phone operated by said at least one listening party;
    detecting a deficiency in the audio quality of a first portion of said audio message; and
    notifying said speaking party of said deficiency, before said audio message has ended, wherein a recorded sample of said deficient audio message, together with a corresponding date and time stamp, is delivered to a carrier associated with said telephone system.

* * * * *